(12) United States Patent
Schoeppe et al.

(10) Patent No.: US 6,631,226 B1
(45) Date of Patent: Oct. 7, 2003

(54) LASER SCANNING MICROSCOPE

(75) Inventors: Guenter Schoeppe, Jena (DE); Stefan Wilhelm, Jena (DE); Ulrich Simon, Jena (DE); Hartmut Heinz, Jena (DE); Bernhard Groebler, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/677,685

(22) Filed: Oct. 2, 2000

Related U.S. Application Data

(62) Division of application No. 09/129,342, filed on Aug. 5, 1998, now Pat. No. 6,167,173.
(60) Provisional application No. 60/055,322, filed on Aug. 11, 1998.

(30) Foreign Application Priority Data

Jan. 27, 1997 (DE) .......................................... 197 02 753

(51) Int. Cl.[7] ................................................ G02B 6/36
(52) U.S. Cl. ........................................................ 385/33
(58) Field of Search ................................ 600/476, 477, 600/478; 436/20, 63, 171, 172; 356/326, 51, 300, 308, 436, 73, 301; 250/339, 339.11, 339.02; 359/308; 385/31, 33, 39, 147

(56) References Cited

U.S. PATENT DOCUMENTS

| | | | | |
|---|---|---|---|---|
| 5,216,484 A | * | 6/1993 | Chao et al. .................. 356/326 |
| 5,283,433 A | * | 2/1994 | Tsien ........................... 250/234 |
| 5,317,379 A | * | 5/1994 | Ryan et al. ................... 356/308 |
| 5,377,003 A | * | 12/1994 | Lewis et al. ................. 356/300 |
| 5,444,528 A | * | 8/1995 | Puschell ....................... 356/73 |
| 5,903,688 A | | 5/1999 | Engelhardt et al. | |
| 5,938,617 A | * | 8/1999 | Vo-Dinh ..................... 436/171 |
| 6,222,961 B1 | | 4/2001 | Engelhardt et al. | |

FOREIGN PATENT DOCUMENTS

| DE | 195 17 670 A1 | 12/1995 |
|---|---|---|
| EP | 0 283 256 | 9/1988 |

OTHER PUBLICATIONS

*English Abstract of DE 195 17 670 A1.

* cited by examiner

Primary Examiner—Akm Enayet Ullah
(74) Attorney, Agent, or Firm—Reed Smith LLP

(57) ABSTRACT

An arrangement and corresponding method are provided for coupling radiation, preferably laser radiation, into a scanning head with a scanning unit in at least two dimensions. The radiation is focussed on an object via a microscope objective via at least one light-conducting fiber which is coupled with the scanning head. A collimator is arranged downstream of the fiber end at the scanning head for collimating the radiation exiting in a divergent manner at the fiber end.

8 Claims, 5 Drawing Sheets

LASER SCANNING MICROSCOPE

This is a division of application Ser. No. 09/129,342, filed Aug. 5, 1998, U.S. Pat. No. 6,167,173. which is based on provisional application Ser. No. 60/055,322, filed Aug. 11, 1998.

The following represents the prior art.

BACKGROUND OF THE INVENTION

The present invention relates to a laser scanning microscope.

Handbook of Biological Confocal Microscopy, Second Edition, Plenum Press, New York and London 1995, page 519, FIG. 6: Fiber coupling optics, page 595, FIG. 14: Telecentric system for a plurality of detection beam paths;

U.S. Pat. No. 5,283,433Coupling optics for detection beam paths;

DE 4323129 A1, column 6: Confocal apertures which can be centered and varied with respect to diameter;

U.S. Pat. No. 5,444,528, U.S. Pat. No. 5,377,003, U.S. Pat. No. 5,317,379, U.S. Pat. No. 5,21,484: AOTF;

U.S. Pat. No. 5,081,350, EP 283256 A1, WO 90/00754: Fiber connection between laser and scanning unit.

OBJECT AND SUMMARY OF THE INVENTION

It is an object to provide an improved laser scanning microscope.

In accordance with the invention, an arrangement and corresponding method are provided for coupling radiation, preferably laser radiation, into a scanning head with a scanning unit in at least two dimensions. The radiation is focussed on an object via a microscope objective via at least one light-conducting fiber which is coupled with the scanning head. A collimator is arranged downstream of the fiber end at the scanning head for collimating the radiation exiting in a divergent manner at the fiber end.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

List of Reference Numbers:

| | |
|---|---|
| M | microscope |
| S | scanning head |
| 1 | light source |
| 2 | illuminating optics |
| 3 | beam splitter |
| 4 | objective |
| 5 | specimen |
| 6 | condenser |
| 7 | light source |
| 8 | receiver |
| 9 | tube lens |
| 10 | tube lens |
| 11 | eyepiece |
| 12 | beam splitter |
| 13.1, 13.2 | lasers |
| 14 | light-conducting fibers |
| 15 | swivelable mirror |
| 16 | collimating optics |
| 17 | beam deflecting element |
| 18 | partially reflecting mirror |
| 19 | monitor diode |
| 20 | neutral filter |
| 21 | line filter |
| 22 | scanning objective |
| 23 | scanner |
| 24 | main beam splitter |
| 25 | imaging optics |
| 26.1–26.4 | detection channels |
| 27 | deflecting prism |
| 28, 28.1, 28.2 | dichroitic beam splitters |
| 29 | adjustable pinholes (pinhole diaphragm) |
| 30 | emission filter |
| 31 | PMT |
| 32 | AOTF |
| 33 | coupling-in optics |
| 34 | central driving unit |
| 35, 36, 37, 38 | local driving units for diode 19, filter changer 21, collimating optics 16, adjustable pinholes 29 |
| 39 | beam splitter |
| 40 | light-conducting fiber |
| S1, S2, F1, F2 | focus positions |
| P1, P2 | pinhole positions |

Figure 1:
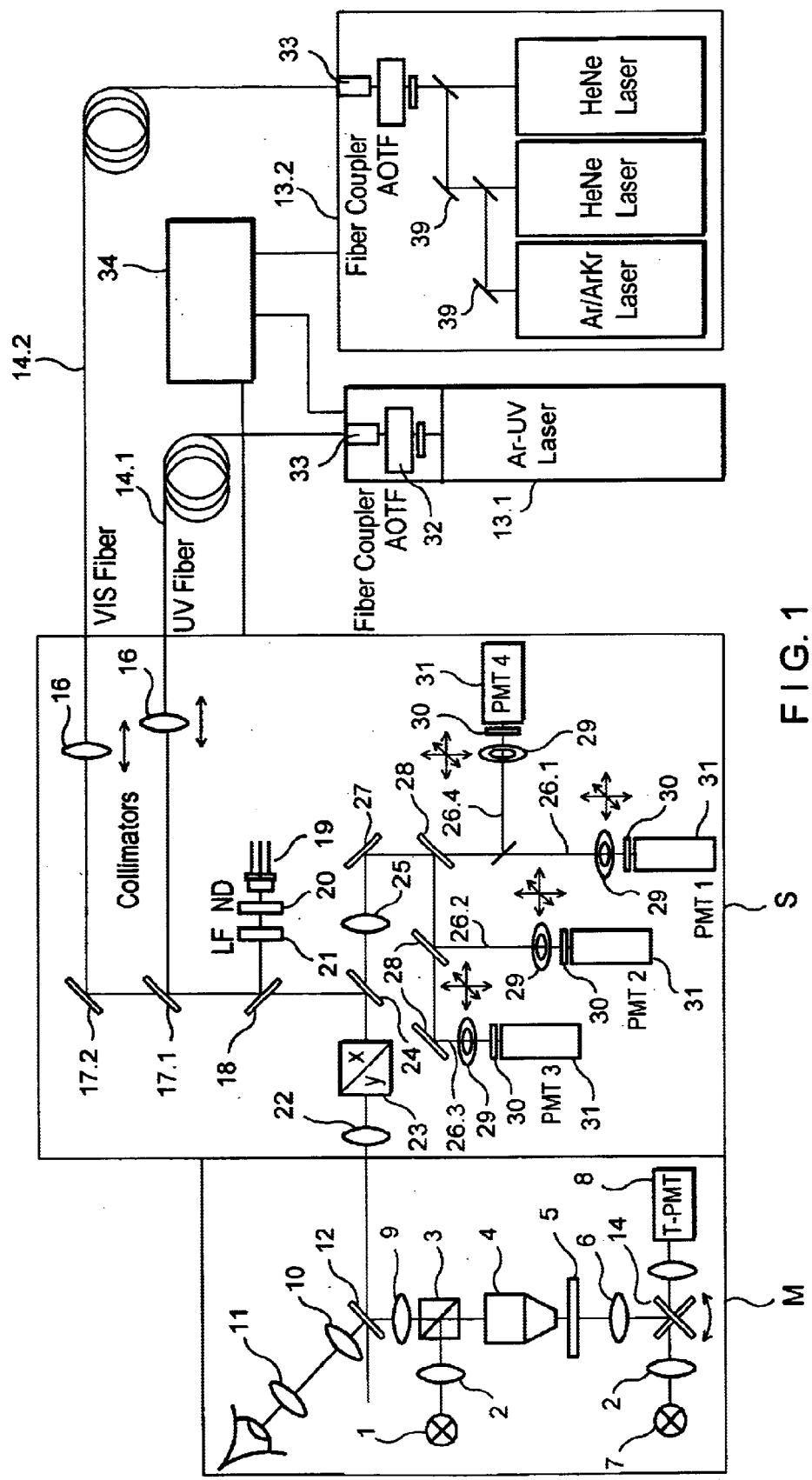
FIG. 1 shows a modular arrangement including microscope M, scanning head S, and laser unit.
Figure 2:
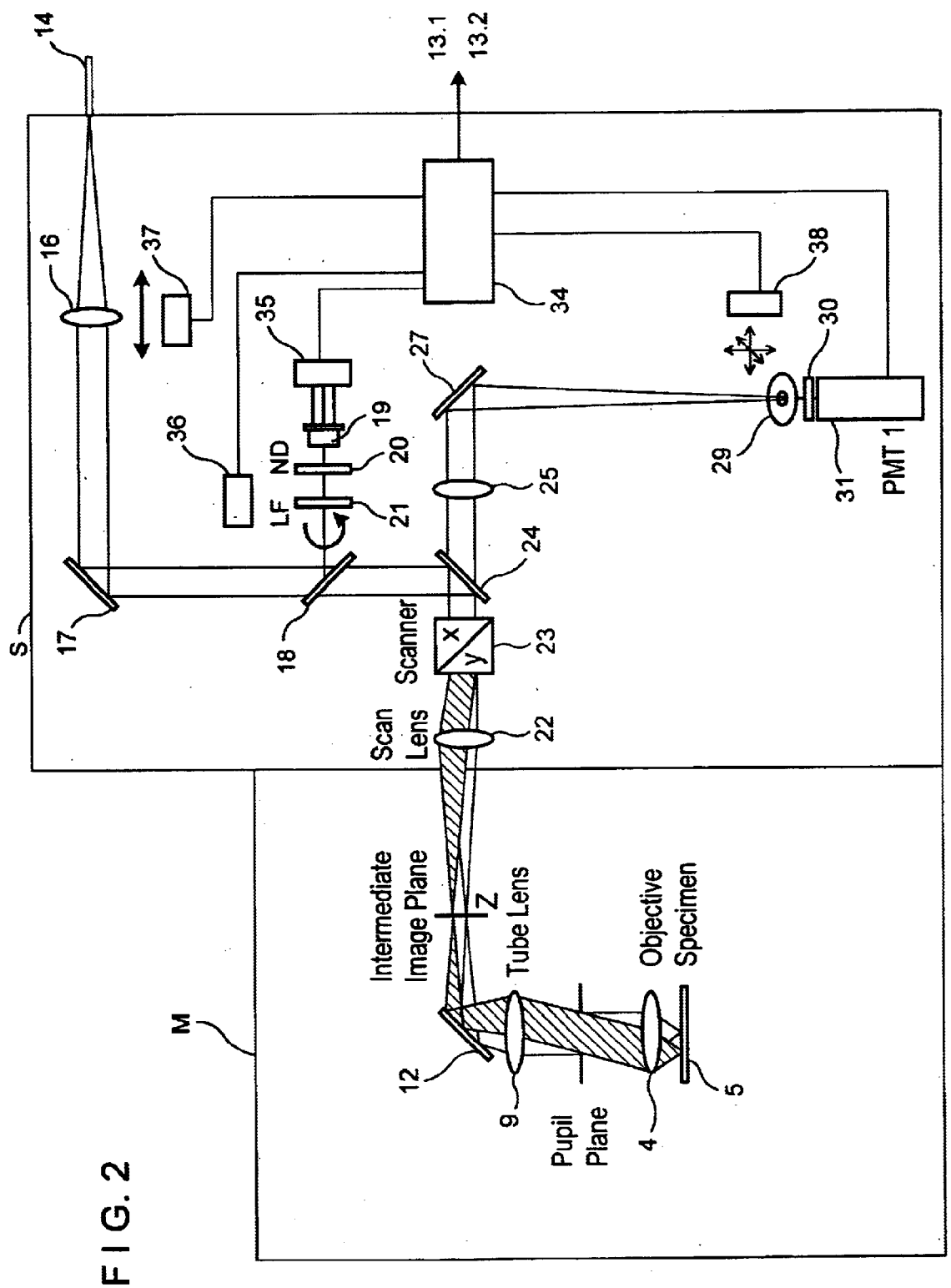
FIG. 2 shows the beam path in the scanning head S.

FIG. 1 shows schematically a microscope unit M and a scanning head S which share an optical interface via an intermediate imaging Z according to FIG. 2. The scanning head S can at the photo tube of an upright microscope and also, in an advantageous manner, at a side output of an inverted microscope.

FIG. 1 shows a microscope beam path which is switchable between reflected-light scanning and transmitted-light scanning by means of a swivelable mirror 14, with light source 1, illuminating optics 2, beam splitter 3, objective 4, specimen 5, condenser 5, light source 7, receiver arrangement 8, a first tube lens 9, an observation beam path with a second tube lens 10, and an eyepiece 11, as well as a beam splitter for coupling in the scanning beam.

A laser module 13.1, 13.2 receives the lasers and is connected with the laser coupling-in unit of the scanning head S via light-conducting fibers 14.1, 14.2. Coupling into the light-conducting fibers 14.1, 14.2 is effected by means of displaceable collimating optics 16 which will be discussed in more detail herein, and by means of beam deflecting elements 17.1, 17.2. A monitor beam path is reduced or stopped down in the direction of a monitor diode 19 by means of a partially reflecting mirror 18; line filters 21 and neutral filters 20 are advantageously arranged in front of the monitor diode 19 on a rotatable filter wheel, not shown.

The actual scanning unit comprises a scanning objective 22, scanner 23, main beam splitter 24, and shared imaging optics 25 for detection channels 26.1 through 26.4. A deflecting prism 27 behind the imaging optics 25 reflects the beam coming from the object 5 in the direction of dichroitic beam splitter 28 in the convergent beam path of the imaging optics 25, downstream of which are arranged pinholes 29, one for each detection channel, and emission filters 30 and suitable receiver elements 31 (PMT); the pinholes 29 are adjustable in the direction of the optical axis and vertically thereto and can be varied with respect to diameter.

Figure 5:
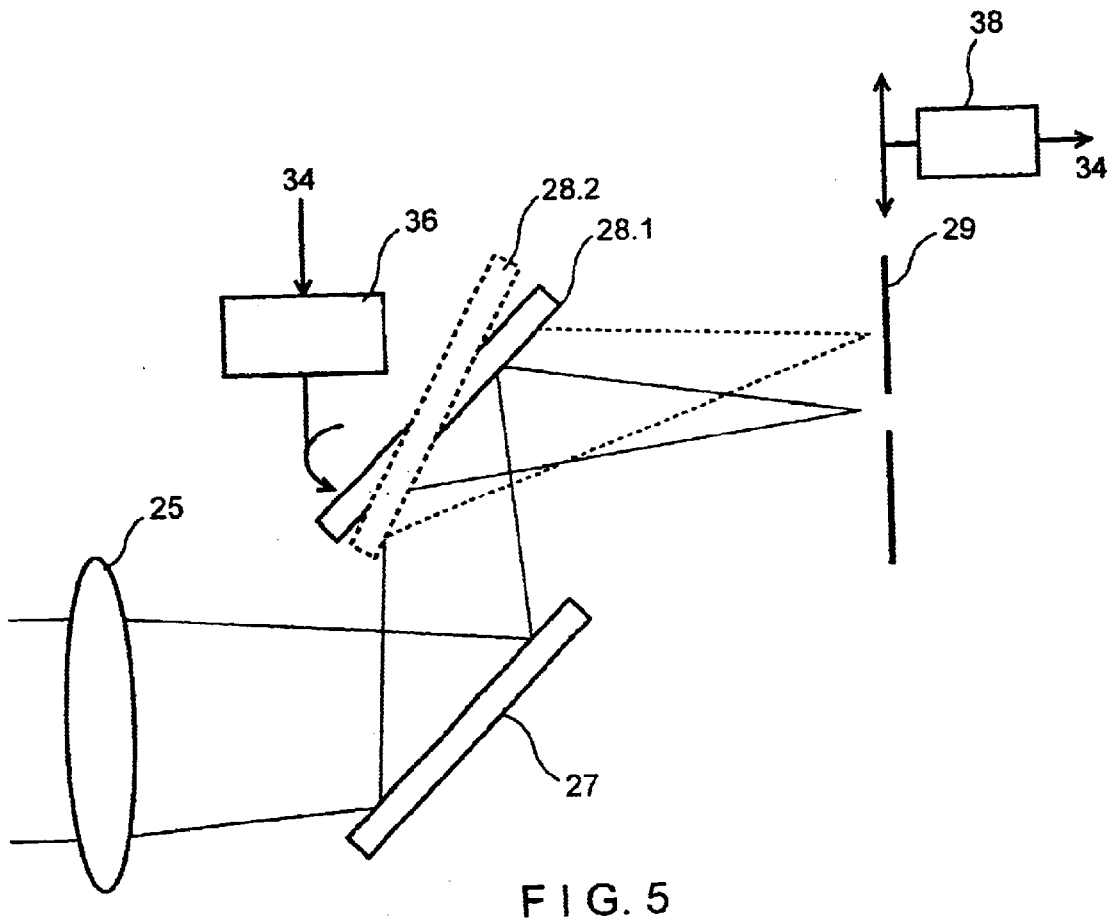
FIG. 5 shows the optical effect of the pinholes which are displaceable vertically to optical axis with different reflecting beam splitters.

As is shown schematically in FIG. 5, the beam splitters 27, 28 can be advantageously constructed as a splitter wheel with a plurality of positions so as to be switchable by means of stepping motors.

UV radiation is advantageously coupled into glass fiber 14.1, preferably a single-mode glass fiber, by means of an AOTF as beam deflector, i.e., when the beam should not fall on the fiber input, it is deflected from the fiber input, e.g., in the direction of a light trap, not shown, by the AOTF.

The coupling-in optics 33 for coupling in the laser beam have lens systems, not shown, for coupling in, the focal length of these lens systems being determined by the beam cross section of the lasers and the numerical aperture required for optimum coupling. Provided in the laser module 13.2 are single-wavelength and multiple-wavelength lasers which are coupled into one or more fibers individually or jointly via an AOTF.

Further, coupling in can also be effected via a plurality of fibers simultaneously, their radiation being mixed on the microscope side by color combiners after passing through adapting optics.

It is also possible to mix the radiation of different lasers at the fiber input; this mixing can be effected by means of the splitter mirror 39, shown schematically, which is designed so as to be exchangeable and switchable.

The laser beam emanating divergently from the end of the fibers 14.1, 14.2 at the scanning unit S in FIGS. 2 and 3 is collimated to an infinite beam by means of collimating optics 16. This is advantageously effected by an individual lens which is displaced along the optical axis by means of a control unit 37 which is drivable by a central drive unit 34 and therefore exercises a focussing function in that its distance from the end of the light-conducting fibers 14.1, 14.2 at the scanning unit can be varied by means of the invention.

Figure 3A:
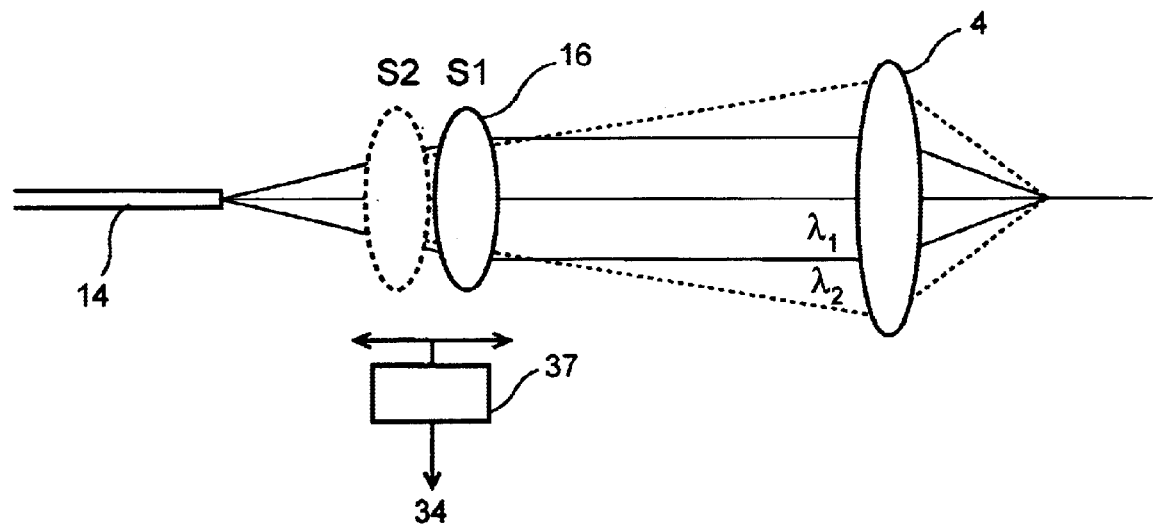
FIG. 3 shows the optical effect of the displaceable collimating optics 16.
Figure 3B:
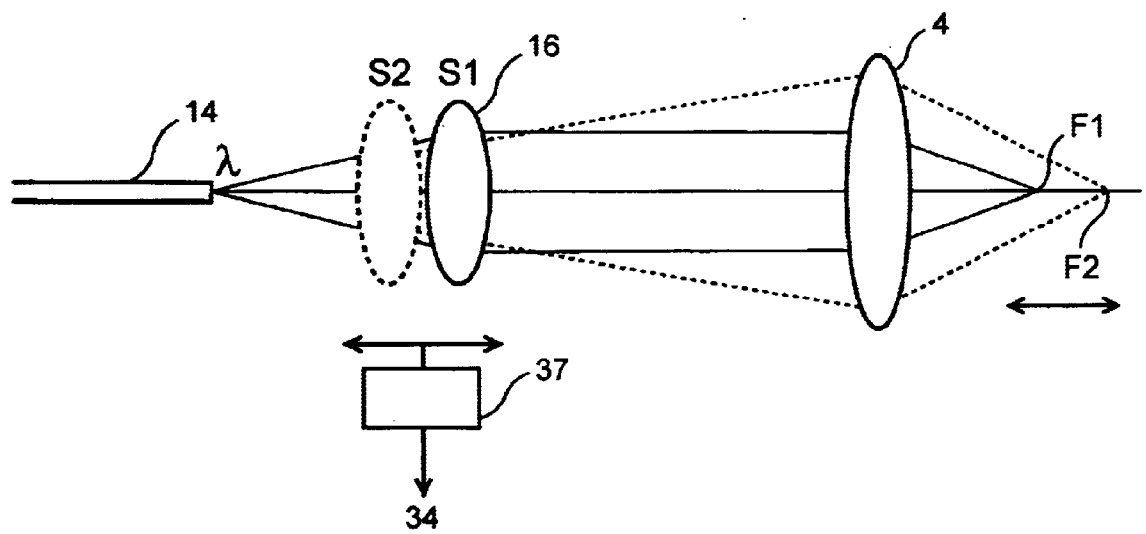

The displacement effect of the collimating optics 16 is shown schematically in FIGS. 3a and 3b. FIG. 3a shows the beam configuration for two different wavelengths $\lambda 1$, $\lambda 2$. Since imaging is effected for a polychromatic light source by stationary imaging optics in an image plane only for a mean wavelength of the spectral region, the spacing of the fiber end and collimating optics is changed by the driving unit 37. Lens positions S1, S2 are given for the two shown wavelengths to ensure the same focus position for both wavelengths. Accordingly, in the case of fluorescence microscopy, the fluorescence radiation occurs in the focus of the objective 4 which is adjusted to infinity and the excitation radiation is focussed in the same plane.

Also, a plurality of fibers and fiber collimators can be used for adjusting different chromatic compensations for different excitation wavelengths. Further, a chromatic correction of the utilized optics, especially of the microscope objective, can be effected in this way.

Different chromatic compensations can be adjusted individually for different wavelengths by means of a plurality of coupling-in fibers and collimating optics. The variable collimation by means of displacement of the lens 16 can also be used to realize z-scanning in that the focus in the specimen is displaced in the z direction by means of the displaceable collimator lens 16 and one optical section after the other is detected. This is shown for a wavelength A in FIG. 3b, wherein the focus positions F1, F2 correspond to positions S1, S2.

In FIG. 2, a monitor diode 19 which can also have a focussing lens, not shown, placed in front of it acts in combination with a line-selective or region-selective filter wheel or filter slide 21, driven by a control unit 36 for permanent monitoring of the laser beam coupled into the scanning module, especially to monitor in an isolated manner the output in a determined laser line and, if need be, to stabilize it by means of a regulating signal of the driving unit 34. The detection by means of the monitor diode 19 includes laser noise and variations due to the mechanical-optical transmission system. In this respect, an error signal can be derived from the detected instantaneous laser output, which error signal retroacts on-line directly on the laser or on an intensity modulator (ASOM, AOTF, EOM, shutter) connected downstream of the laser for the purpose of stabilizing the laser output radiated into the scanning module. A stabilization of intensity with respect to wavelength and a monitoring of laser output can accordingly be effected by controlling the filter unit 21.

By means of a connection to the detection means 31 (PMT) and to the central driving unit, a noise reduction can be effected by taking the signal quotient of and/or by signal subtraction of the detection signal and of the monitor signal of the diode 19 in that the corresponding sensor signal of a detection channel is normalized or standardized (e.g., division) with respect to the signal of the monitor diode by pixel as pixel-frame information in order in this way to reduce intensity fluctuations in the image.

FIG. 1, in a schematic view, shows pinholes 29 in the detection channels 26.1–26.4, which pinholes 29 are adjustable in different ways. In particular, they can be arranged so as to be displaceable vertically to the optical axis or in the direction of the optical axis and, in a known manner, so as to be variable in diameter, e.g., by means of a shearing mechanism or cat's eye. The adjustment of the pinhole diameter allows them to be adapted to the diameter of the Airy disk at different observation wavelengths.

Figure 4:
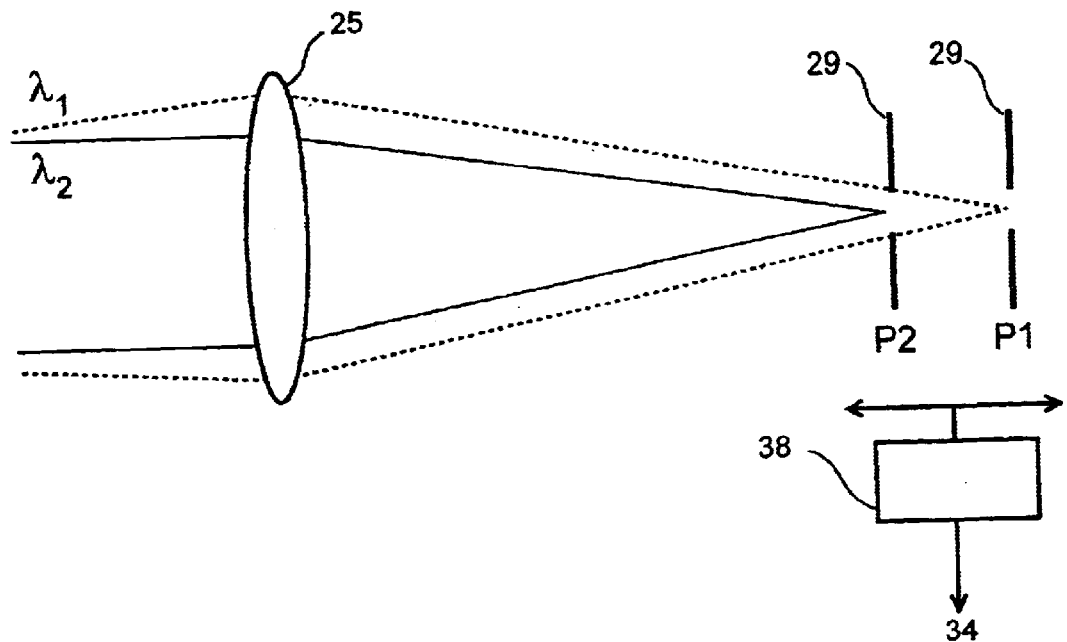
FIG. 4 shows the optical effect of the pinholes which are displaceable in the direction of the optical axis.

FIGS. 4 and 5 show schematic views of driving means 38 for the adjustment or displacement of the individual pinholes which have data lines to the central driving unit 34. The controllable displacement of the pinhole in the direction of the optical axis is shown schematically in FIG. 4. It is advantageous for compensation of optical errors, especially chromatic longitudinal aberrations. These errors can occur in the scanning objective 22, but also, for example, in the shared imaging optics 25 for the detection channels.

Due to chromatic longitudinal deviations, different focus positions which correspond to different pinhole positions P1, P2 result for different wavelengths $\lambda 1, \lambda 2$. When exchanging imaging optics, for example, of the microscope objective, an automatic displacement of the pinhole can be effected along the optical axis via the driving unit 34 and controlling and displacing means 38 with known chromatic longitudinal aberrations of the utilized optics. An exact adjustment to the utilized excitation wavelength can be carried out.

Due to the imaging optics 25 shared by all of the detection channels and advantageously comprising only one optical element, the image at infinity which is generated by the scanning objective 22 is imaged in the pinhole plane. The shared imaging optic 25 brings about an improved transmission efficiency compared with known solutions. Nevertheless, an exact alignment can be effected in cooperation with the imaging optics with individually adjustable pinholes in the individual detection channels.

Different dichroitic beam splitters 28 can be used in the beam path, depending on the wavelength that is used, in order to block only these wavelengths and direct them to a detection beam path. Therefore, there are splitter turrets or splitter wheels (not shown) in different beam paths for swiveling in different splitters of the smallest possible size, especially splitter wheels whose wheel axis is inclined by 45° relative to the optical axis so that the splitters are always only displaced in the reflection plane. Since the splitters 28 arranged on the splitter wheels cannot be adjusted exactly alike and variations in their alignment or standard wedge tolerances can cause different beam deflecting angles, the respective pinhole is displaced via control unit 38 vertically to the optical axis corresponding to the beam deflection as is shown in FIG. 5. Shown here in a schematic view through different positions are two splitters 28.1, 28.2 on a splitter wheel, not shown, driven by a control unit 36, resulting in focus positions in the plane of the pinholes 29 displaced vertically to the optical axis. For this purpose, a coupling of the position of the pinhole 29 with the splitter wheel position for the splitters 28 can be effected by means of the driving unit 34 via the control units 36, 38, i.e., an optimum pinhole position can be stored and called up for all splitter configurations of different splitter turrets. This applies not only for the position of a determined splitter wheel, but also for the position of a plurality of splitter wheels, so that the respective optimum pinhole position is always set automatically.

Figure 6:
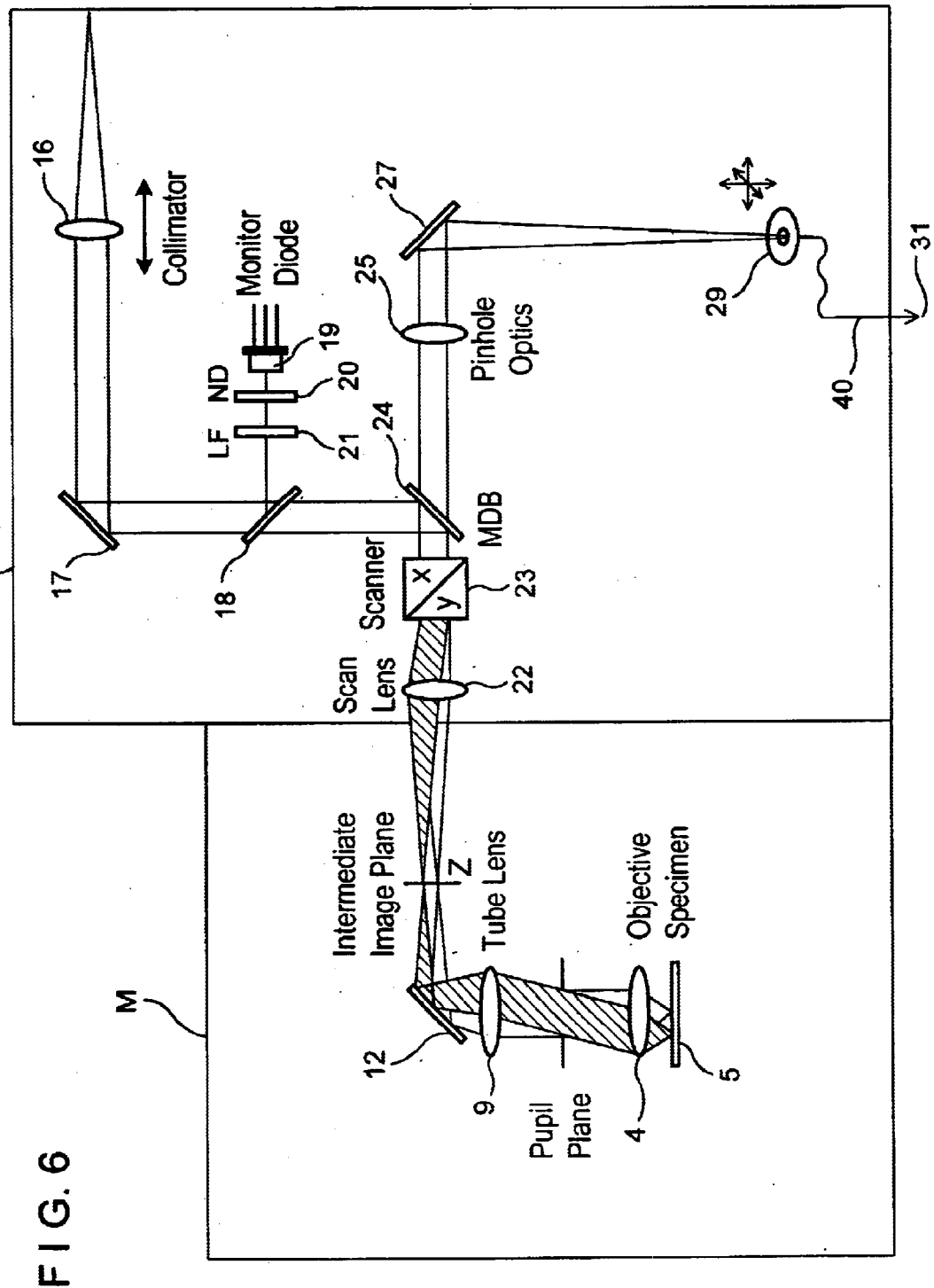
FIG. 6 shows the scanning head S, microscope M, and a fiber behind the pinhole in the detection beam path.

FIG. 6 shows schematically how a light-conducting fiber 40 can be placed at the pinhole 29 at the output to the PMT behind the pinhole in order to guide the beam through the pinhole of the detection channel to an external sensor 31. This is advantageously effected without additional coupling optics close behind the pinhole by means of the light-conducting fiber 38. Since the pinhole aperture is adjustable, the exchange of fibers with different core diameters is greatly simplified in that the pinhole size is adapted to the core diameter.

while the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above, and all equivalents thereto.

What is claimed is:

1. An arrangement for coupling laser radiation, into a scanning head of a laser scanning microscope, the scanning head having a scanning unit scanning in at least two dimensions, comprising:

a microscope objective for focusing the radiation on an object;

at least one light-conducting fiber coupled with the scanning head, the radiation being focused on the object via said at least one light-conducting fiber; and an AOTF arranged between a UV laser and a light-guide input of said at least one light-conducting fiber.

2. A method for the operation of an arrangement according to claim 1, wherein the UV-radiation is directed to the light-guide input or is directed past this light-guide input by controlling the AOTF.

3. A method of coupling radiation in a laser scanning microscope, the method comprising:

inputting a UV laser radiation from a laser source into an optical fiber wherein the inputted laser radiation is scanned by a scanning head having a scanning unit that can scan in at least two dimensions;

focusing the scanning laser radiation on an object through a microscope objective; and wherein the laser radiation is directed to the optical fiber or is directed past the optical fiber by controlling an AOTF coupled between the optical fiber and the laser source.

4. An arrangement for coupling laser radiation in a laser scanning microscope, comprising:

an optical fiber operable to receive a laser radiation from a laser source;

an AOTF disposed between the laser source and the optical fiber;

a scanning head coupled to the optical fiber and having a scanning unit operable to scan in at least two dimensions; and a microscope objective for focusing a scanning laser radiation on an object for imaging the object.

5. The arrangement according to claim 4, wherein the AOTF controls the wavelength of laser radiation directed to the optical fiber.

6. The arrangement according to claim 4, wherein the AOTF controls the intensity of the laser radiation.

7. The arrangement according to claim 4, further comprising a detection unit operable to detect radiation proceeding from the scanned object to image the object.

8. The arrangement according to claim 7, further comprising:

at least one splitter mirror; and wherein the laser source includes at least two different lasers coupled to the at least one splitter mirror to feed radiation from the at least two different lasers into the AOTF.

* * * * *